United States Patent [19]

Willard

[11] 4,286,528

[45] Sep. 1, 1981

[54] EXHAUST FILTER SYSTEM

[76] Inventor: Stephen Willard, 45 Elm St., Woodstock, Vt. 05091

[21] Appl. No.: 71,126

[22] Filed: Aug. 30, 1979

[51] Int. Cl.³ .............................................. F23J 15/00
[52] U.S. Cl. ............................. 110/203; 165/DIG. 2; 165/176; 110/216
[58] Field of Search ............... 110/203, 216, 215, 217; 165/110, 176, DIG. 2; 126/364, 297; 431/215

[56] References Cited

U.S. PATENT DOCUMENTS

| | | | |
|---|---|---|---|
| 113,413 | 4/1871 | Fisher | 165/DIG. 2 |
| 417,874 | 12/1889 | Leonard | 165/DIG. 2 |
| 1,986,538 | 1/1935 | Schimke | 165/DIG.2 |
| 4,027,602 | 6/1977 | Mott | 110/203 |
| 4,078,602 | 3/1978 | Richer | 165/DIG. 2 |

*Primary Examiner*—Edward G. Favors

[57] ABSTRACT

An exhaust filter system for filtering a creosote component from exhaust gases of a combustion chamber burning wood, primarily for use with airtight wood burning stoves, comprises an airtight filter apparatus arranged between a combustion chamber outlet for the exhaust gases and a flue for removing the filter exhaust gases. The filter includes a gas distributing chamber in communication with the combustion chamber outlet and receiving hot exhaust gases therefrom and a gas collecting chamber in communication with the flue and delivering filtered exhaust gases thereto. A heat exchange unit airtightly connects the gas distributing and collecting chambers. The unit defines a vertical flow path for the exhaust gases and is capable of cooling the gases to a temperature range wherein the creosote component present in the hot exhaust gases in vaporized form is condensed to a liquid. A sump is mounted to receive the condensed liquid by gravity from the heat exchange unit. The filter apparatus is arranged to provide a thermally induced, natural draft for the exhaust gases from the combustion chamber outlet to the flue.

16 Claims, 10 Drawing Figures

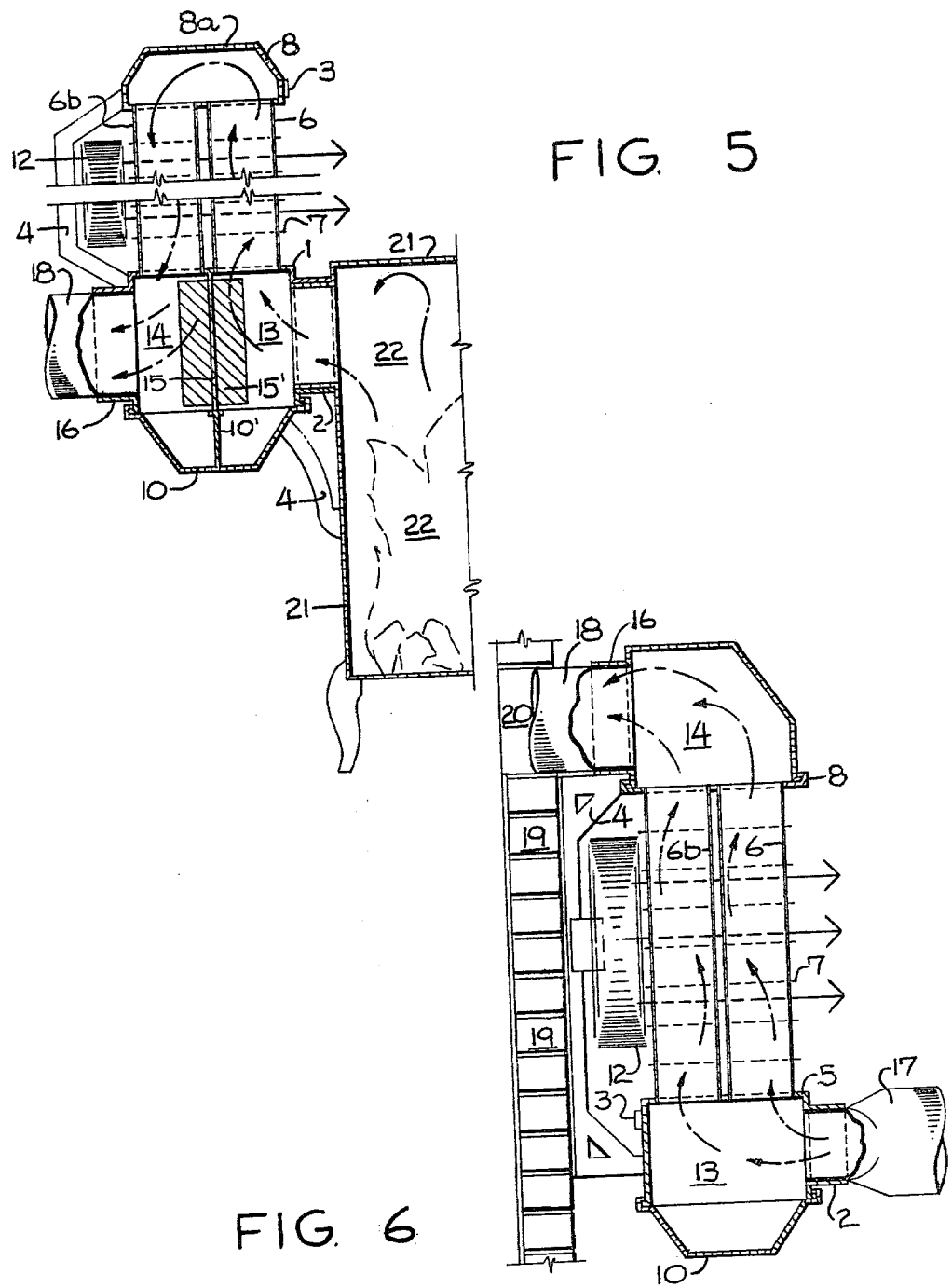

EXHAUST FILTER SYSTEM

The present invention relates to an improved exhaust filter system for filtering a creosote component from exhaust gases of a combustion chamber burning wood, more particularly an airtight wood burning stove including the combustion chamber.

Due to the growing scarcity and skyrocketing costs of other fuels, wood is becoming an ever more attractive fuel for residential stoves and furnaces. Modern airtight wood stoves permit the amount of air supplied to the combustion chamber of the stove to be monitored closely so that low and even combustion rates may be maintained. Wood stoves which are not airtight allow unwanted air to infiltrate into the combustion chamber through poorly sealed joints, causing burning of the wood to accur at accelerated rates, thus consuming up to 2 or 3 times more wood during a heating season than airtight wood stoves. However, while airtight stoves save wood, the lower burning temperature (in the range of about 250° F. to 500° F.) cause considerable amounts of combustible materials, such as tar, volatile oils and water, which are burned under hotter conditions, to escape with the exhaust gases from the combustion chamber. These combustible materials have been termed "creosote component" in the claims. As the exhaust gases or smoke go up the chimney, at least some of the creosote component condenses on cooler chimney surfaces and forms an encrustation of syrupy to runny consistency thereon, depending on the water content of the creosote component. The creosote component initially gathering on the chimney walls contains pyroligneous acid which entraps the carbon particles in the exhaust gases. After the water and volatile compounds evaporate, a substance that hardens into flakes remains. Eventually, the deposits become a layer of almost pure carbon burning at extremely high temperatures, in excess of 3000° F. If the carbon ignites, which happens, the resultant heat creates a huge oxygen demand, forcefully sucking oxygen through the exhaust system at an accelerated rate. Flaming chunks of creosote and melted mortar may be thrown out of the top of the chimney by the updrafts and stove pipes have literally been torn apart by the combination of excessive heat and the forceful oxygen draft. Such chimney fires have contributed to an alarming increase in house fires.

Unlike such fuels as oil, natural gas or anthracite, wood is not a homogeneous substance. Moisture content and wood fiber density vary considerably in different species. Even within the same log, moisture content will fluctuate significantly as the ends dry much faster than the inner core. Under low burning rates associated with airtight stoves, these variations in combustion properties are intensely amplified and may even have a sufficient retarding effect to cause a wood fire to extinguish itself if left unchecked. To minimize this problem, it is desirable for the exhaust pipe leading from the stove to the flue to present minimal resistance to the free flow of the exhaust gases therethrough.

Various exhaust filter systems for filtering particles out of exhaust gases are disclosed in U.S. Pat. Nos. 1,901,370, 2,014,287, 2,392,872 and 4,027,602. U.S. Pat. No. 896,805 discloses a smoke purifying and consuming apparatus which includes a horizontally extending heat exchanger through which the smoke is forced by a fan.

It is the primary object of this invention to meet the indicated problems and to provide an exhaust filter system which effectively and efficiently filters the creosote component from exhaust gases of a combustion chamber burning wood while assuring a thermally induced, natural draft for the exhaust gases from the combustion chamber outlet to the flue.

The above and other objects are accomplished according to the invention with an airtight filter apparatus arranged between a combustion chamber outlet for the exhaust gases and a flue for removing the filtered exhaust gases. The apparatus includes a gas distributing chamber in communication with the combustion chamber outlet and receiving hot exhaust gases therefrom and a gas collecting chamber in communication with the flue and delivering filtered exhaust gases thereto. A heat exchange unit airtightly connects the gas distributing and collecting chambers. The heat exchange unit defines a vertical flow path for the exhaust gases between the gas distributing and collecting chambers and is capable of cooling the gases to a temperature range wherein the creosote component present in the hot exhaust gases in vaporized form is condensed to a liquid. A sump is mounted to receive the condensed liquid by gravity from the heat exchange unit.

Since the heat exchange unit introduced into the exhaust system has a dampening effect due to the reduction of draft velocity resulting from the cooling of the exhaust gases, a mechanically induced draft by a fan mounted in the flow path of the exhaust gases would normally be necessary to counterbalance the reduction of the draft velocity. However, this could tend to overcompensate unless very carefully thermostatically controlled and thus to generate excessive suction forces within the combustion chamber, accelerating burning and, in turn, unduly increasing wood consumption. This would not only be expensive and require complicated apparatus but it would also necessitate extensive maintenance. According to the present invention, the filter apparatus is so arranged as to provide a natural draft for the exhaust gases, thus assuring proper draft conditions without a mechanically induced draft. This natural draft may be assured by an unimpeded upward flow of the exhaust gases through the vertical flow path but, preferably, means is provided in the filtering apparatus for thermally inducing the natural draft.

The above and other objects, advantages and features of the present invention will become more apparent from the following detailed description of certain now preferred embodiments thereof, taken in conjunction with the partially schematic drawing wherein FIG. 1 is a front elevational view showing one embodiment of the stove exhaust filter system of this invention;

FIGS. 5 to 8 are smaller views similar to the view of FIG. 4 and illustrating four other embodiments of the stove exhaust filter system.

In the drawing, like reference numerals have been used to designate like parts operating in an equivalent manner in all figures to avoid redundancy in the description and facilitate a ready understanding of the principle underlying the illustrated structural combinations.

Figure 1:
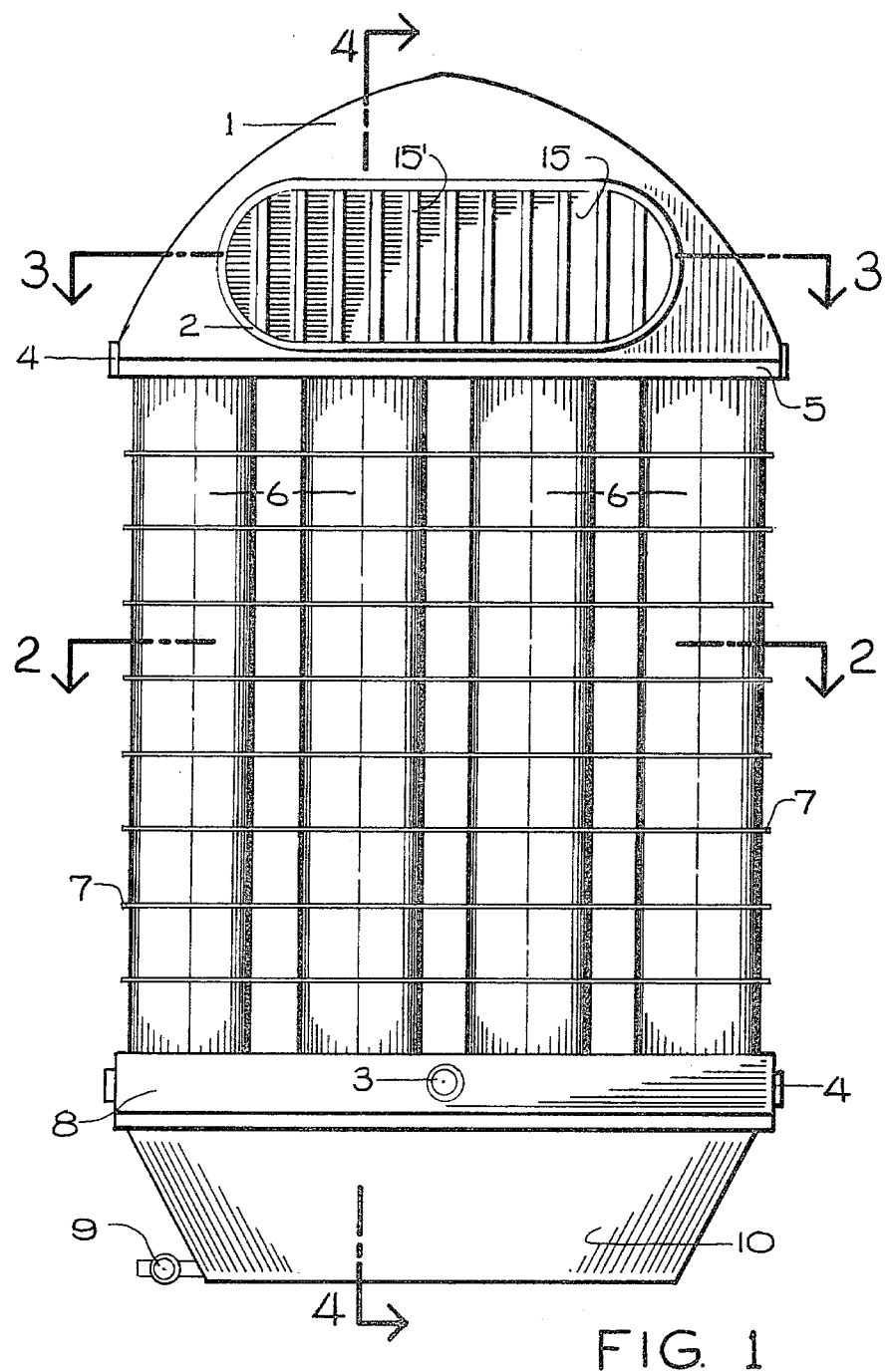

Referring first to the embodiment shown in FIGS. 1 to 4, the illustrated stove exhaust filter system is shown to receive stove exhaust gases from a stove pipe of which only standard elliptical adapter 17 is illustrated. The filter system comprises distributor head 1 which defines exhaust gas distributing chamber 13. Short connecting pipe 2 is attached to the distributor head and is of an elliptical cross section matching that of adapter 17 which accordingly fits into the connecting pipe for detachable attachment thereto, the stove pipe thus being in communication with the distributing chamber which receives the exhaust gases from the stove through this connection.

The exhaust gas filter system further comprises heat exchange means in communication with distributing chamber 13 and defining a vertical flow path for the exhaust gas coming from the distributing chamber, the heat exchange means being capable of cooling the exhaust gas in this flow path. The illustrated heat exchange means is comprised of two rows of cooling tubes 6, 6b, preferably of copper or like good heat conducting material, and arranged back-to-back, four tubes being used in each row in the illustrated embodiment. The two rows of cooling tubes are mounted in tube plates 5 and 8, the respective ends of the tubes being either welded to the tube plates or being integral therewith to form a heat exchange unit. The two rows of cooling tubes 6, 6b form a U-shaped vertical flow path for the exhaust gases, as shown by the arrows in FIG. 4, causing the exhaust gases to flow from distributing chamber 13 into collecting chamber 14, the gases flowing vertically downwardly through tubes 6 and vertically upwardly through tubes 6b, being reversed at the bottom of the filter system by catch pan 10 whose purpose will be explained hereinafter.

Figure 2:
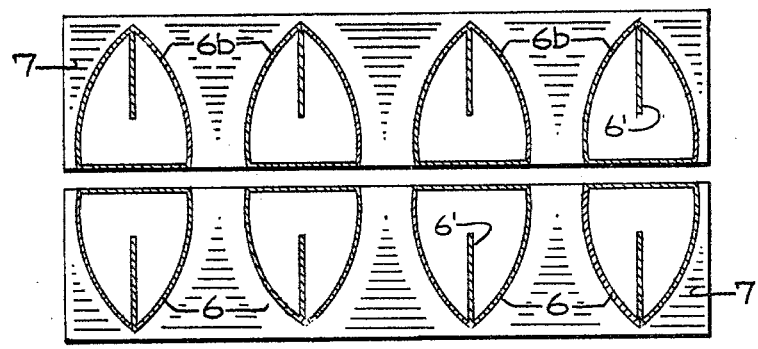
FIG. 2 is a horizontal section along line 2—2 of FIG. 1.
Figure 3:
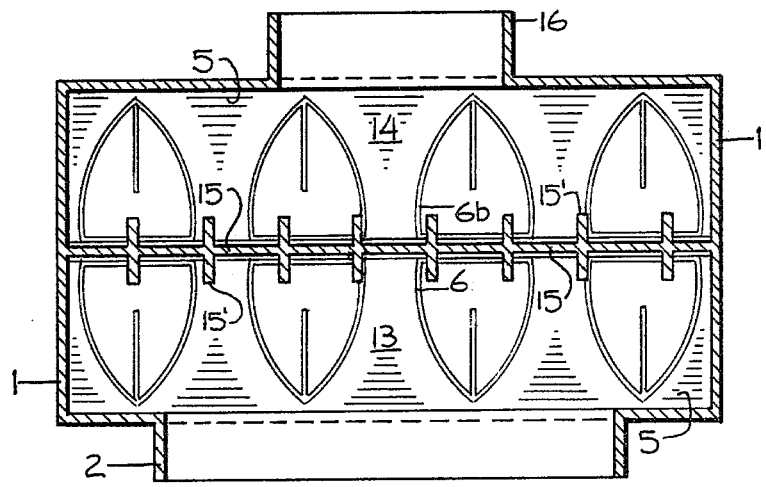
FIG. 3 is another horizontal section along line 3—3 of FIG. 1.

The cooling efficiency of the heat exchange system is considerably enhanced by attaching metallic fins 7 to the outer surfaces of cooling tubes 6, 6b, a series or horizontal fins extending along the entire length of the flow path of the exhaust gases. Furthermore, the tubes are of more or less triangular horizontal cross section, as best shown in FIGS. 2 and 3, with two substantially parabolic side walls facilitating the flow of air around and along the tubes in a transverse direction, longitudinally extending fins 6' extending into the interior of the tubes from their apices for further enhancement of the heat exchange. Fan 12 is mounted behind the back-to-back rows of cooling tubes to provide a transverse forced air flow thereacross, as indicated by the horizontal arrows in FIG. 4. This fan is carried by bracket 4 which also supports tubes plates 5, 8 of the filter system for attaching the system to wall 19. Support bracket 4 is bolted to the wall.

Figure 4:
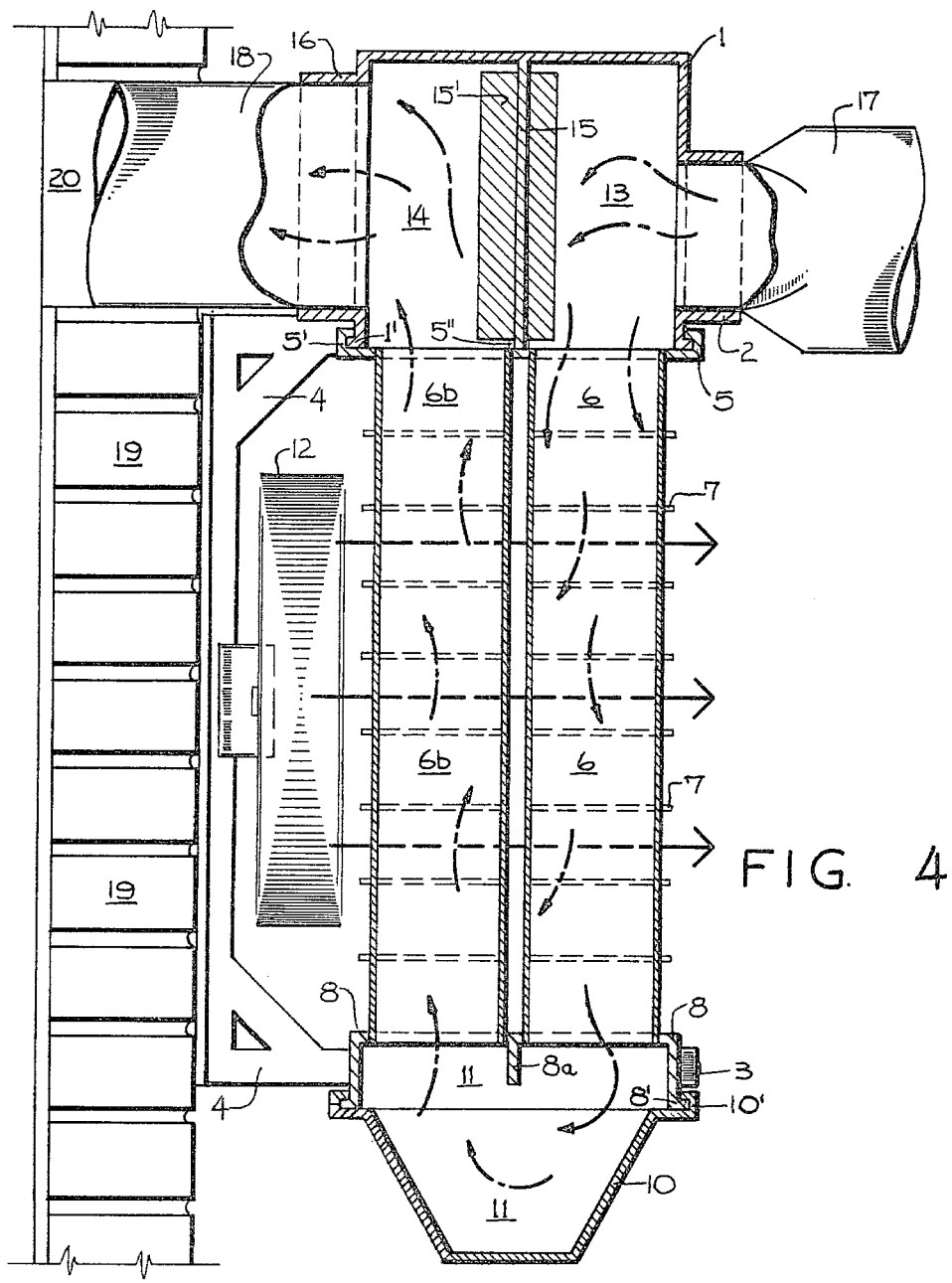
FIG. 4 is a vertical section along line 4—4 of FIG. 1.

In the embodiment illustrated in FIGS. 1–4, see particularly FIG. 4, distributor head 1 is divided by heat transfer plate 15 in distributing chamber 13 and collecting chamber 14. The heat transfer plate has a series of vertically extending fins 15' to enhance the heat transfer efficiency of the plate and may either be welded to the distributor head or be cast therewith into an integral unit. This arrangement has the following advantage:

The exhaust gases enter distributing chamber 13 at their highest temperature, which may be of the order of about 250° F. to 500° F.) and are cooled down along the vertical flow path through cooling tubes 6, 6b, the flow velocity of the gases being significantly reduced along the flow path due to the cooling and the tortuous flow path. By transfer of heat from chamber 13 to chamber 14, the cooled gases arriving in chamber 14 are heated there so that the flow velocity is increased for an enhanced draft through exhaust pipe 18 leading into flue opening 20, thus providing a means for thermally inducing the natural draft.

Short connecting pipe 16 is attached to distributor head 1 opposite connecting pipe 2 and detachably receives exhaust pipe 18 for communication with collecting chamber 14.

The heat exchange unit is connected to the distributor head in an airtight manner and the distributing and collecting chambers are separated from each other in an airtight manner so as to provide an airtight flow path for the exhaust gases from distributing chamber 13 to collecting 14. Also, the airtight connection between the heat exchange unit and distributor head 1 is preferably readily detachable so that the heat exchange unit may be removed for cleaning or repair, preferably without tools.

The illustrated airtight connection and separation are provided by sliding joints. As shown in FIG. 4, distributor head 1 has connecting flanges 1' forming a slide track and upper tube plate 5 has conforming L-shaped flanges 5' airtightly fitting the slide track to permit easy removal of the heat exchange unit from the distributor head. Tube plate 5 also has a centrally extending guide track 5" airtightly receiving heat transfer plate 15. Flanges 1', 5' as well as guide track 5" and plate 15 form airtight seals. Other types of airtight and preferably detachable seals may be used.

Condensate catch pan 10 is also attached to the heat exchange unit in an airtight and preferably readily detachable manner, the illustrated airtight seal being of the same type as described hereinabove. For this purpose, lower tube plate 8 has connecting flanges 8' forming a slide track and the catch pan has conforming L-shaped flanges 10' airtightly fitting the slide track to permit easy removal of the pan from the heat exchange unit.

All parts of the filter system are of metal.

The operation of the above-described exhaust filter system will now be described in connection with the filtration of the exhaust gases coming from an airtight wood-burning stove. As is known, due to the relatively low burning temperatures of the wood in such stoves (about 250° F. to 500° F.), the exhaust gases contain not only unburned gas but also varying amounts of creosote, tars, volatile liquids, pyroligneous acid and water. The filter system is designed to function primarily as a dehumidifier removing these liquids from the exhaust gases and preventing them from encrusting the walls of the chimney.

The exhaust gases containing the various liquids in vapor form at the high temperatures at which they enter distributing chamber 13 are cooled in the flow path through the heat exchange unit to a temperature in the range of 100° F. to 200° F., in which general temperature range the vaporized liquids, which may have soot suspended therein, form a condensate on the inner surfaces of cooling tubes 6, 6b (and on fins 6'). Since the tubes extend vertically, the condensate flows down under the force of gravity into sump 11 defined by catch pan 10. If the inner surfaces of the tubes and fins 6' are coated with "Teflon", the will tend to be self-cleaning since this coating reduces the tendency of the condensate to stick to the walls.

The condensate collected in sump 11 is a liquid and may be removed from the sump from time to time through a drain pipe equipped with shut-off valve 9 by opening the valve.

Since substantially all combustible material is thus removed from the exhaust gases before they reach collecting chamber 14, the exhaust gases enter flue opening 20 free of such material, thus preventing encrustation of the chimney with the combustible material. If combustible material is permitted to accumulate in significant quantities in the chimney over a period of time and the flash point is reached, a chimney fire will occur. This is effectively prevented with the exhaust filter system of the present invention since substantially all combustible material is removed from the exhaust gases in this system.

According to one preferred feature of this invention, the heat exchange unit is equipped with multi-purpose vent valve 3 which preferably is thermostatically controlled to open automatically when the exhaust gas temperatures become excessively hot, i.e. exceed a set upper limit for most efficient operation of the cooling system. Valve 3 is mounted on lower tube plate 8 of the heat exchange unit and will admit ambient cooler air into the unit upon being opened to be mixed with the hot exhaust gases flowing therethrough and thereby to cool the exhaust gases.

As shown in FIG. 4, septum 8 projects downwardly from tube plate 8 towards sump 11 in the axial plane of the sump and extends to a level below vent valve 3. Thus, if catch pan 10 is not emptied, for whatever reason, by opening shut-off valve 9 in the drain pipe, septum 8a will prevent the liquid collected in sump 11 from overflowing through opened vent valve 3. As the liquid level in the sump rises to the level where septum 8a contacts the liquid or becomes immersed therein, the septum will effectively block the flow of exhaust gases through the heat exchange unit and to flue opening 20, thus smothering the fire in the stove whence the exhaust gases come. Therefore, the filter system will be shut down before overflow occurs at vent valve 3.

In addition to providing supplemental cooling for excessively hot exhaust gases, the vent valve also serves another purpose. As the valve is opened, the thermally induced draft in the exhaust system is diluted due to the induced drop in temperature and the resultant reduced flow velocity of the exhaust gases causes a corresponding reduction of venting the exhaust gases from the combustion chamber of the stove. This results in reduced combustion rates under the control of vent valve 3 so that the generated gas temperatures are in keeping with the capabilities of the heat exchange unit.

Except for the changes in structure and arrangement indicated hereinbelow, the embodiment of FIG. 5 is constructed and functions in a manner equivalent to that of the embodiment of FIGS. 1-4, like reference numerals designating like parts operating in a like manner.

In this embodiment, the flow path of the exhaust gases through the heat exchange unit is reversed, i.e. the gases first flow vertically upwardly and then vertically downwardly through the cooling tubes 6 and 6b. The gases enter distributing chamber 13 of distributor head 1 from combustion chamber 22 of stove or boiler 21. The inversion of the filter system permits the heat extracted from cooling tubes 6, 6b to be circulated to the room occupied by the stove by operation of fan 12. Removable catch pan 10 is detachably mounted on the distributor head in an airtight manner and a separating wall 10' divides the interior of the catch pan into two chambers airtightly separated from each other, separating wall 10' forming an airtight seal with heat transfer plate 15. Separating wall 10' prevents the entering exhaust gases from flowing under the heat transfer plate into collecting chamber 14 and thus by-passing the filter system. Tube plate 8 defines a gas flow reversing chamber covered by a detachably mounted top plate 8a which may be removed for purposes of cleaning the system.

In the embodiment of FIG. 6, the downward flow path of the exhaust gases through the filter system has been eliminated. The exhaust gases enter distributing chamber 13 of distributor head 1, as in the above-described embodiments, but the distributing chamber is not divided by a heat transfer plate. Thus, the gases enter tubes 6 and 6b from below, passing vertically upwardly therethrough in an unimpeded path into collecting chamber 14. The elimination of the U-shaped gas flow path reduces the resistance to the gas flow and produces a natural upward draft flow during the filtration and cooling. Therefore, a good draft is maintained in the exhaust system without any heat transfer plate boosting the draft.

However, in the absence of a heat transfer plate, it becomes extremely important that overcooling of the exhaust gases does not occur in the heat exchange unit of the filter system. If this should happen, the draft in the exhaust could be severely restricted, causing the fire in the combustion chamber to be smothered. This may be avoided by monitoring the velocity of fan 12 with a thermostat maintaining the gas temperature in the filter system in an approximately range of 190° F. to 210° F. Exceeding this range would result in incomplete filtration and falling below about 190° F. would dampen or completely smother the fire in the stove.

A disadvantage of the inverted filter systems of FIGS. 5 and 6 is the closeness of the hot exhaust gases entering distributing chamber 13 to catch pan 10 wherein the condensate of combustible materials is received from cooling tubes 6, 6b. The resultant high temperature in the catch pan causes the condensate to vaporize and thus to mix again with the exhaust gases, thus increasing the content of combustible materials in the exhaust gases before they go through filtration. This imposes an increased work load in the filter system, requiring either a larger fan 12 or a larger heat exchange unit for effective cooling. Also, the system must be cleaned more frequently.

Figure 7:
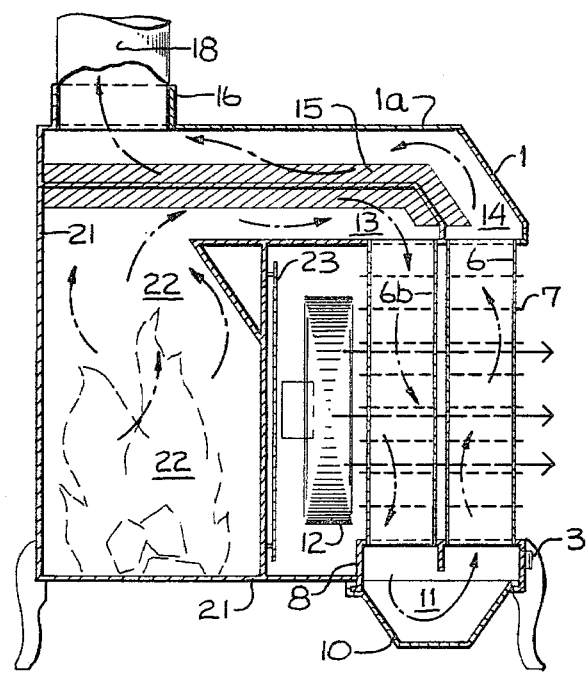

In the embodiment of FIG. 7, the exhaust filter system of FIGS. 1-4 is shown integrated with airtight wood stove or boiler 21. The exhaust gases from combustion chamber 22 enter distributing chamber 13 directly, avoiding any creosote deposits accumulating in the stove pipe leading the exhaust gases into the distributing chamber. In this case, the top of stove 21 serves as an ideal heat transfer plate 15 between distributing chamber 13 and collecting chamber 14, permitting the heat from combustion chamber 22 to be transferred directly to the cooled outflowing gases at exhaust pipe 18. In this system, the thermally driven draft of the exhaust gases is extremely responsive to the rate of combustion and the encountered resistance. In turn, an ideal natural draft flow is continually maintained in the filter system.

To permit access for cleaning collecting chamber 14, a removable closure plate 1a is mounted on distributor head 1. Heat shield 23 is mounted on stove 21 between the stove and the heat exchange unit. Sheet metal shield 23 deflects radiant heat emanating from the stove and increases the life of the fan motor.

Figure 8:
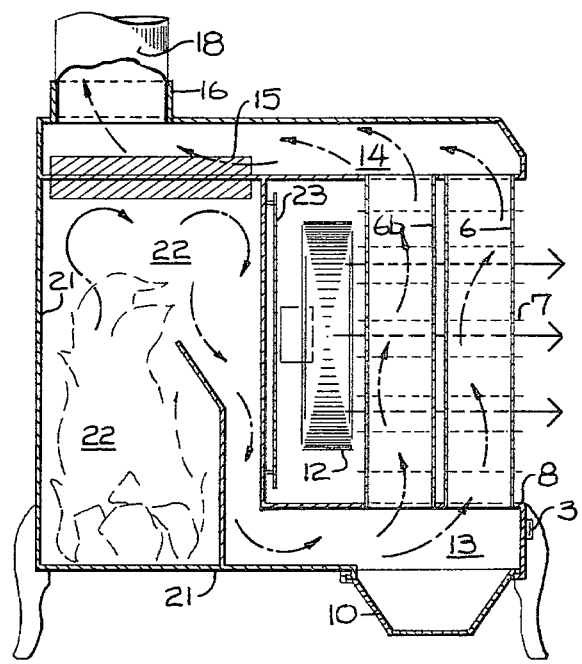

FIG. 8 illustrates an embodiment of the invention in which the filter system of FIG. 6 is integrated with an airtight wood stove or boiler. Except for the described differences, the embodiments of FIGS. 5 to 8 are constructed and operate in the manner fully set forth in connection with FIGS. 1 to 4.

As will be apparent from the above description of certain now preferred embodiments of the present invention, the wood stove exhaust filter system functions primarily as a dehumidifier using a heat exchanger to reduce the temperature of the exhaust gases to a point where vaporized liquids in the gases will condense into a collectible liquid. The soot intermixed with, and suspended in, the volatile liquids is removed from the exhaust gases with the condensate. The filter system addresses itself particularly to the unique problems encountered in the operation of residential airtight wood burning stoves and furnaces, assuring the removal of the creosote component from the exhaust gases while providing a thermally induced, natural draft thereof.

The filter system involves low operational costs, the only expense being the electric current consumption of the fan blowing cooling air across the heat exchange unit. At the same time, it uses the thermal energy within the exhaust gases as the driving force of the gases through the exhaust system to overcome the resistance imposed by the heat exchange unit and to provide and maintain a natural draft flow necessary for maximum performance of airtight wood stoves at low combustion rates. The overall design is simple and accordingly inexpensive to manufacture and to maintain, various parts being preferably readily detachable for cleaning and repair. The system is compact in size and may be readily adapted to existing exhaust system while providing efficient filtering capacity. The vertical position of the cooling tubes minimizes adhesion and creosote deposits within the filter and thus reduces the need for cleaning, this effect being further enhanced by lining the tubes with "Teflon".

The illustrated and preferred back-to-back arrangement of two rows of cooling tubes providing a downwardly directed flow path leg and an upwardly directed flow path leg providing a U-shaped vertical flow path produces very effective cooling of the exhaust gases to assure complete removal of all vaporized liquids in the gases. Under normal conditions and without filtration, the gases entering the chimney are relatively hot and large amounts of pyroligneous acid escapes with the gases into the chimney. If the exhaust filter only partially removes the liquids due to insufficient cooling, it may have an accelerating effect on carbon build-up within the chimney. Therefore and in accordance with this invention, the filter system must be capable of cooling the gases to a temperature range wherein the creosote component present in the hot exhaust gases in vaporized form is condensed to a liquid substantially in its entirety. This is accomplished in accordance with the preferred embodiment by the combination of a fan blowing cooling air across the heat exchange tubes and the tube arrangement itself. The two-leg flow path doubles the number of cooling tubes within essentially the same space, thus increasing the heat exchange area used for cooling by a factor of 2. With a single row of tubes, their length would have to be doubled to obtain the same cooling effect. Using two rows of tubes, together with the fan, provides a compact, yet very effective cooling system. The triangular cross section of the cooling tubes, with their preferably parabolic side walls, permit convecting air to flow freely about the heat exchanger, enabling a relatively small fan to be used for equivalent cooling. The longitudinally extending fins inside the tubes serve further to accelerate the heat transfer.

One of the outstanding properties of the exhaust filter system of this invention is its ability to use existing thermal energy from the hot exhaust gases as the driving force for the gases through the system, thus doing away with the need for a fan to provide this force. The driving mechanism must provide sufficient force to achieve and maintain a natural flow of the gases without under or overcompensating for the resistance to the gas flow induced by the cooling filter. In this respect, the embodiments of FIGS. 1 to 5, 7 and 8 are particularly effective since the heat from the hot incoming exhaust gases is directly transferred to the cooled gases at the exit of the filter system, thus reheating them and assuring a thermally induced natural draft. Since the incoming gases are rather dense due to the presence of vaporized liquids therein while the outgoing gases have a reduced density because these liquids have been filtered out, the thermal energy available from the heat transfer to the gas collecting chamber suffices to provide a natural draft, and this draft is self-regulating. The amount of thermal energy transferred from the gas distributing to the gas collecting chamber is directly proportional to the heat present in the exhaust coming from the combustion chamber. As the combustion rate increases, so does the exhaust temperature, the draft velocity and the encountered resistance along the flow path. This, in turn, increases the amount of thermal energy transferred to the outflowing gases to compensate for the added resistance. An equilibrium between the existing thermal energy and the resistance is maintained automatically as combustion rates fluctuate.

The length of the cooling tubes will be at least in part a function of the power of the fan, a fan capable of generating large volumes of high-velocity cooling air obviously requiring less cooling surface and thus shorter cooling tubes for obtaining the same cooling effect, and vice versa.

Any suitable metal may be used for the various parts of the filter system, copper tubing being particularly effective for the heat exchange unit.

Figure 9:
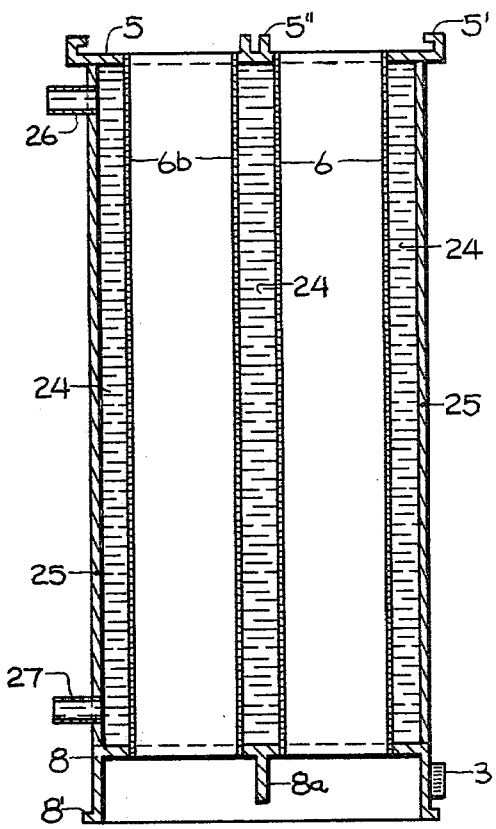
FIGS. 9 and 10 are sectional views of another embodiment of a heat exchange unit smaller to the illustrations of FIGS. 4 and 3.
Figure 10:
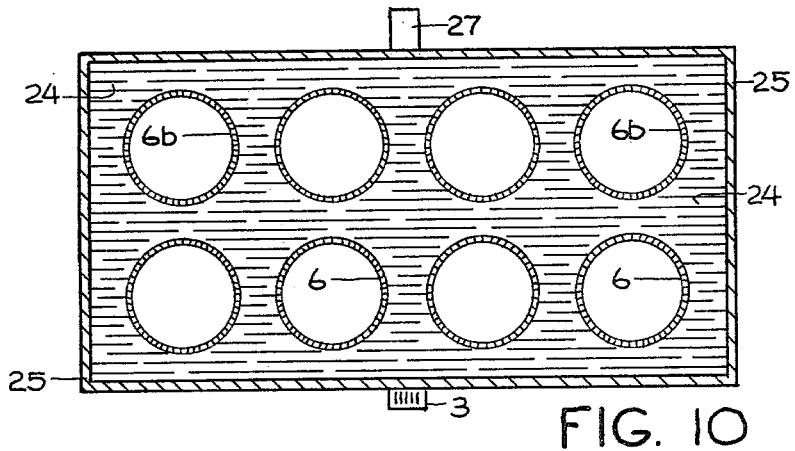

The longitudinal and transverse sectional views of FIGS. 9 and 10 show a heat exchange unit for an exhaust filter system otherwise like that of FIGS. 1–4, like reference numerals indicating like parts functioning in a like manner to avoid redundancy in the description of this modified heat exchange unit. In substance, the unit differs from that of FIGS. 1–4 by using a liquid instead of a gaseous coolant. Obviously, the same principle may be applied to the heat exchange units of the other embodiments.

Since water is readily available, particularly where the wood stove is also used for heating water, water is the preferred liquid coolant although liquid refrigerants undergoing phase changes at lower temperatures may also be used, if desired.

In this embodiment of the heat exchange unit, no air fan for blowing air across the cooling tubes is required. Rather, cooling tubes 6, 6b are mounted in housing 25 extending between tubes plates 5 and 8 with which the housing may be integral or to which it may be welded. The cooling tubes are submerged in coolant liquid 24 circulated through the housing which surrounds the tubes. The coolant liquid enters housing 25 through inlet pipe 27 and is removed therefrom through outlet pipe 26. Pipes 26 and 27 may be connected to the water circulating system of a water heat, if desired.

As will be noted from FIG. 10, the cooling tubes are of circular cross section in this embodiment since the parabolic side walls are not needed for best air circulation.

What is claimed is:

1. An exhaust filter system for filtering a creosote component from exhaust gases of a combustion chamber burning wood, which comprises an airtight filter apparatus arranged between a combustion chamber outlet for the exhaust gases and a flue for removing the filtered exhaust gases, the filter apparatus including a gas distributing chamber in communication with the combustion chamber outlet and receiving hot exhaust gases therefrom, a gas collecting chamber in communication with the flue and delivering filtered exhaust gases thereto, a heat exchange unit airtightly connecting the gas distributing and collecting chambers, the heat exchange unit defining a vertical flow path for the exhaust gases between the gas distributing and collecting chambers and being capable of cooling the gases to a temperature range wherein the creosote component present in the hot exhaust gases in vaporized form is condensed to a liquid, the heat exchange unit being comprised of two rows of heat exchange tubes and two tube plates attached to respective ends of the tubes, the two rows of tubes being arranged back-to-back, a fan means for blowing air transversely across the heat exchange tubes, and a sump mounted to receive the condensed liquid by gravity from the heat exchange unit, the filter apparatus being arranged to provide a natural draft for the exhaust gases from the combustion chamber outlet to the flue.

2. The exhaust filter system of claim 1, further comprising means for thermally inducing the natural draft.

3. The exhaust system of claim 1, wherein the heat exchange unit defines an unimpeded upward vertical flow path for the exhaust gases from the gas distributing to the gas collecting chamber, and further including means for controlling the temperature range to prevent the temperature of the exhaust gases in the upward vertical flow path from falling to a point inhibiting the natural upward draft.

4. The exhaust filter system of claim 1, further comprising "Teflon" linings for the heat exchange tubes.

5. The exhaust filter of claim 1, wherein the heat exchange tubes have a substantially triangular cross section.

6. The exhaust filter system of claim 5, wherein the exchange tubes have two parabolically shaped side walls facilitating the flow of air transversely across the tubes.

7. An exhaust filter system for filtering a creosote component from exhaust gases of a combustion chamber burning wood, which comprises an airtight filter apparatus arranged between a combustion chamber outlet for the exhaust gases and a flue for removing the filtered exhaust gases, the filter apparatus including a distributor head defining a gas distributing chamber in communication with the combustion chamber outlet and receiving hot exhaust gases therefrom, and a gas collecting chamber in communication with the flue and delivering filtered exhaust gases thereto, a heat transfer plate airtightly separating the distributor head into the distributing and collecting chambers, a heat exchange unit airtightly connecting the gas distributing and collecting chambers, the heat exchange unit defining a vertical flow path including a first vertical flow path leg receiving the hot exhaust gases from the distributing chamber and a second vertical flow path leg in series with the first flow path leg, the second flow path leg receiving the exhaust gases from the first flow path leg and delivering the gases to the collecting chamber, whereby the gases are progressively cooled as they pass through the flow path to a temperature range wherein the creosote component present in the hot exhaust gases in vaporized form is condensed to a liquid, and a sump mounted to receive the condensed liquid by gravity from the heat exchange unit, the heat transfer plate transferring heat from the distributing chamber at the beginning of the flow path to the collecting chamber at the end of the flow path for reheating the cooled gases and thereby thermally to induce a natural draft for the exhaust gases from the combustion chamber outlet to the flue.

8. The exhaust filter system of claim 7, wherein the heat exchange unit is comprised of two rows of heat exchange tubes and two tubes plates attached to respective ends of the tubes, the two rows of tubes being arranged back-to-back, a first one of the tube plates being detachably and airtightly mounted on the distributor head, one of the rows of heat exchange tubes defining the first vertical flow path leg and the other row of heat exchange tubes defining the second vertical flow path leg.

9. The exhaust filter system of claim 8, further comprising a catch pan detachably and airtightly mounted on the second tube plate, the catch pan defining the sump, the first vertical flow path leg extending vertically downwardly and the second vertical flow path leg extending vertically upwardly.

10. The exhaust filter system of claim 8, further comprising a catch pan detachably and airtightly mounted on the distributor head, the catch pan defining the sump, the first vertical flow path leg extending vertically upwardly towards the second tube plate and the second vertical flow path leg extending vertically downwardly from the second tube plate, and a separating wall in airtight engagement with the heat transfer plate dividing the catch pan into two airtightly separated chambers respectively in communication with the distributing and collecting chambers.

11. The exhaust filter system of claim 8 and integrated with an airtight wood burning stove including the combustion chamber, and filter system being arranged laterally adjacent the combustion chamber and the distributor head extending above the combustion chamber, the distributing chamber being in direct communication with the combustion chamber and the heat transfer plate extending thereabove.

12. The exhaust filter system of claim 1 or 2, wherein the heat exchange unit is comprised of a plurality of vertically extending heat exchange tubes, and further comprising a source of coolant fluid for surrounding the heat exchange tubes with coolant fluid.

13. An exhaust filter system for filtering a creosote component from exhaust gases of a combustion chamber burning wood, the filter system being integrated with an airtight wood burning stove including the combustion chamber and being arranged laterally adjacent the combustion chamber, which comprises an airtight filter apparatus arranged between a combustion chamber outlet for the exhaust gases and a flue for removing the filtered exhaust gases, the filter apparatus including a gas distributing chamber in communication with the combustion chamber outlet and receiving hot exhaust gases therefrom, a gas collecting chamber extending above the combustion chamber and in communication with the flue and delivering filtered exhaust gases thereto, a heat exchange unit airtightly connecting the gas distributing and collecting chambers, the heat exchange unit defining a vertical flow path for the exhaust gases between the gas distributing and collecting chambers and being capable of cooling the gases to a temperature range wherein the creosote component present in the hot exhaust gases in vaporized form is condensed to a liquid, a sump mounted to receive the condensed liquid by gravity from the heat exchange unit, and a heat transfer plate mounted between the combustion chamber and the gas collecting chamber for transferring heat from the combustion chamber to the collecting chamber at the end of the flow path for reheating the cooled gases and thereby to induce thermally a natural draft for the exhaust gases from the combustion chamber outlet to the flue.

14. An exhaust filter system for filtering a creosote component from exhaust gases of a combustion chamber burning wood, which comprises an airtight filter apparatus arranged between a combustion chamber outlet for the exhaust gases and a flue for removing the filtered exhaust gases, the filter apparatus including a gas distributing chamber in communication with the combustion chamber outlet and receiving hot exhaust gases therefrom, a gas collecting chamber in communication with the flue and delivering filtered exhaust gases thereto, a heat exchange unit airtightly connecting the gas distributing and collecting chambers, the heat exchange unit being comprised of two rows of vertically extending heat exchange tubes defining a vertical flow path for the exhaust gases between the gas distributing and collecting chambers and being capable of cooling the gases to a temperature range wherein the creosote component present in the hot exhaust gases in vaporized form is condensed to a liquid, and two tube plates attached to respective ends of the tubes, the two rows being arranged back-to-back, a housing surrounding the heat exchange tubes, a coolant liquid circulating through the housing and surrounding the heat exchange tubes, and a sump mounted to receive the condensed liquid by gravity from the heat exchange unit, the filter apparatus being arranged to provide a natural draft for the exhaust gases from the combustion chamber outlet to the flue.

15. The exhaust filter system of claim 14, further comprising means for thermally inducing the natural draft.

16. The exhaust filter system of claim 14, wherein the heat exchange tubes have a substantially circular cross section.

* * * * *